Aug. 25, 1925.

D. R. TRIPPLEHORN 1,550,933

COMPRESSED AIR MOTOR FOR PUMPS

Filed Feb. 11, 1922     3 Sheets-Sheet 1

Inventor
David R. Tripplehorn
By John M. Spellman
Attorney

Aug. 25, 1925.  
D. R. TRIPPLEHORN  
1,550,933  
COMPRESSED AIR MOTOR FOR PUMPS  
Filed Feb. 11, 1922     3 Sheets-Sheet 2

Inventor  
David R. Tripplehorn  
By John M. Spellman  
Attorney

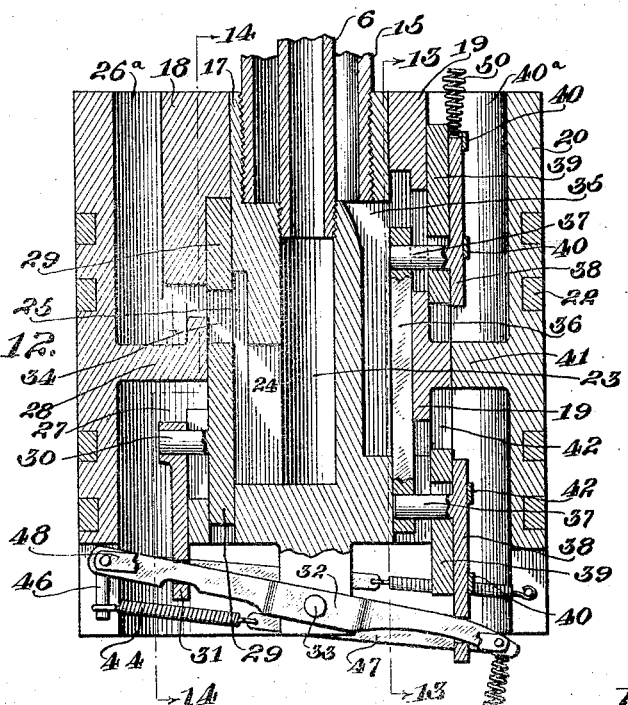

Patented Aug. 25, 1925.

1,550,933

UNITED STATES PATENT OFFICE.

DAVID R. TRIPPLEHORN, FORT WORTH, TEXAS.

COMPRESSED-AIR MOTOR FOR PUMPS.

Application filed February 11, 1922. Serial No. 535,699.

*To all whom it may concern:*

Be it known that I, DAVID R. TRIPPLE-HORN, a citizen of the United States, residing at Fort Worth, in the county of Tarrant and State of Texas, have invented certain new and useful Improvements in Compressed-Air Motors for Pumps, of which the following is a specification.

This invention relates to pumps of the pneumatic type for the removal or pumping of liquid from wells and it relates more particularly to the novel construction and arrangement of a compressed air motor in connection with a pump of this nature.

The invention is an improvement over Letters Patent No. 955,296 granted to me April 19, 1910, by the United States for compressed air motor for pumps and it should be understood that the present invention follows the principle of the original invention and aims to improve certain parts thereof to provide a more practical and accurate pump.

One of the principal objects of the invention is the construction in a pump of this nature wherein by an arrangement of sliding valves and parts the inlet and exhaust of air is directly through the piston of the air motor.

Other objects such as an improved plunger arrangement for lifting the liquid, improved means for procuring a more positive and certain action of the valves in the air motor piston, and an arrangement for admission of and exit of air to and from the cylinders will be better understood by reference to the following description taken in connection with the accompanying drawings, forming part hereof in which—

Figure 1:
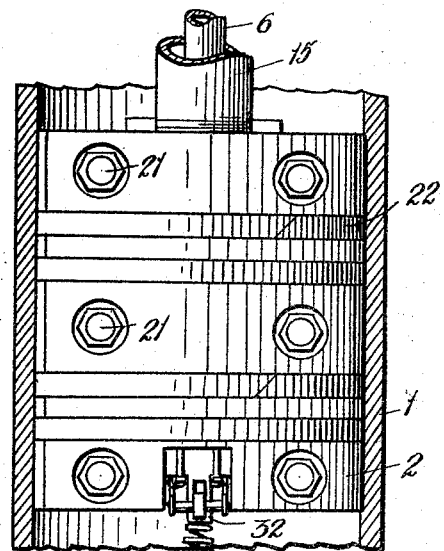
Figure 1 is a side elevational view of the air piston seated in a portion of its cylinder, with connecting inlet and exhaust pipes partly shown.
Figure 2:
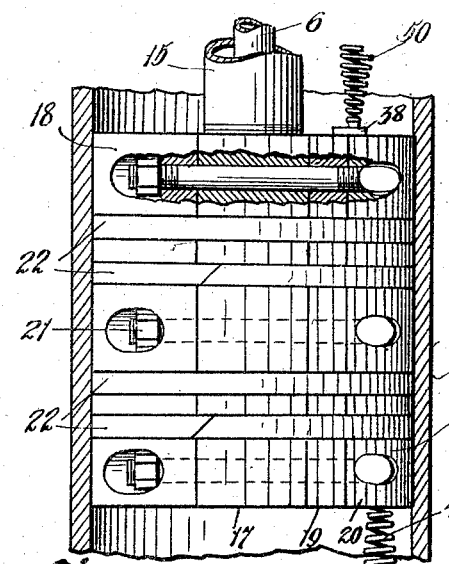
Figure 2 is a view similar to Figure 1 with the piston turned about one-fourth around toward the right in the drawing.
Figure 3:
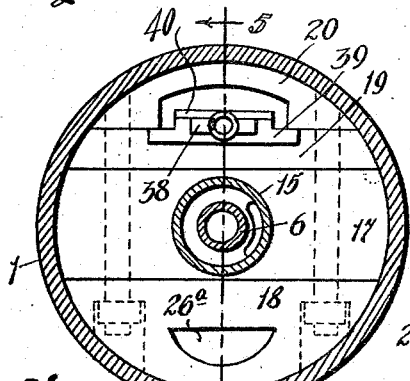
Figure 4:
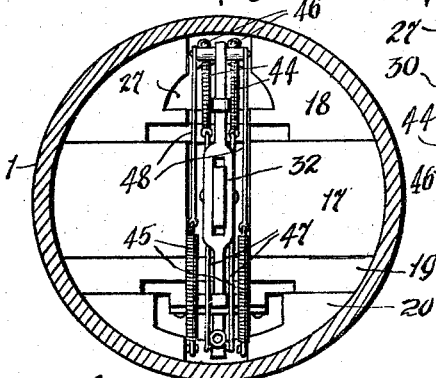
Figure 5:
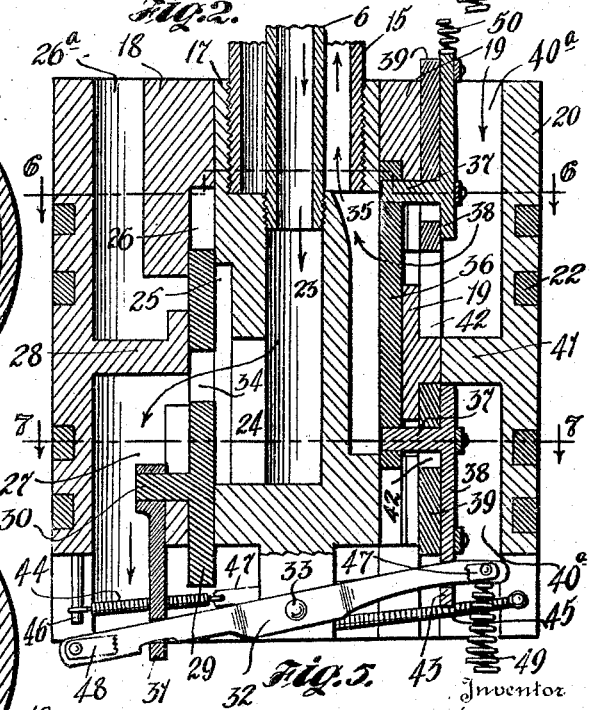

Figures 3 and 4 denote a top and a bottom view, respectively, of the piston, and Figure 5 is a vertical sectional view thereof, taken on line 5—5 of Figure 3.

Figure 6:
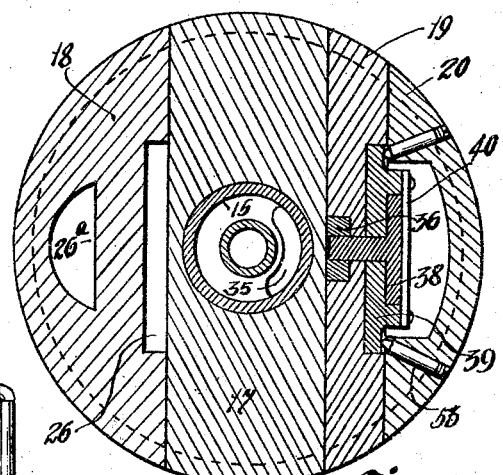
Figure 7:
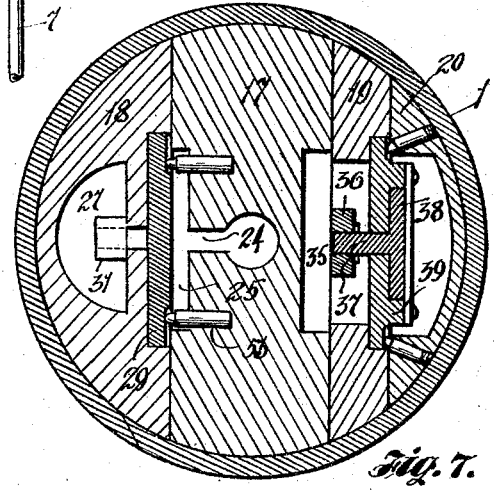

Figures 6 and 7 are cross-sectional views taken on lines 6—6 and 7—7 of Figure 5.

Figures 8, 9:
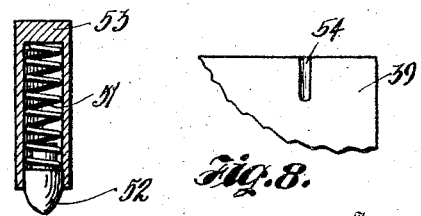

Figures 8 and 9 are detail views of the arrangement for holding the piston valves in vertical position against pull of gravity at certain movements of the parts.

Figure 10:
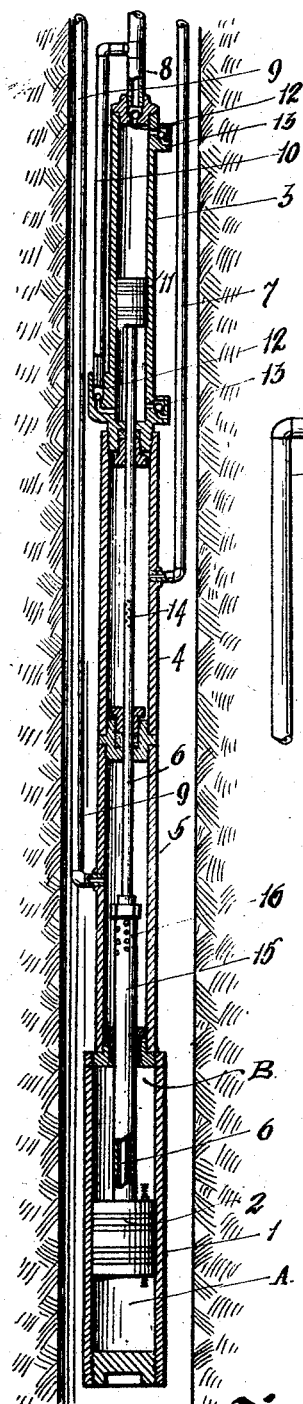
Figure 11:
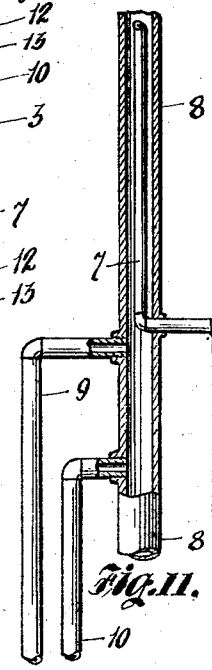

Figure 10 is a vertical sectional view of the entire device, with the exception of its extreme upper pipe connections, illustrating the invention in operative position in a well, Figure 11 being a detailed partial longitudinal sectional view of the upper pipe connections broken away from Figure 10.

Figure 12 is a vertical section of the piston, showing the position of the valves on the downward stroke of the piston.

Figure 13 is a vertical section on the line 13—13 of Figure 12.

Figure 14 is a vertical section on the line 14—14 of Figure 12.

Reference being had more in detail to the drawings, in Figure 10 the device is illustrated in position in a well and comprises a cylinder 1 wherein is arranged a piston 2, above which is a pump cylinder 3. Intermediate the pump cylinders 1 and 3 are pipes 4 and 5 comprising, respectively, an air inlet chamber and an air exhaust chamber, connecting the cylinder 1 and 3 together and provided with suitable packing for a reciprocating plunger rod 6, referred to hereinafter. Compressed air is supplied from a pump, not shown, of any preferred construction, through a feed pipe 7. In Figure 11 the air feed pipe 7, the delivery pipe 8 and air exhaust pipe 9 are shown in enlarged detail from a point above the top of the device illustrated in Figure 10, the view in Figure 11 being broken away for convenience and for better illustration. 10 denotes a lower delivery pipe leading from the bottom of the pump barrel or cylinder 3.

Within the pump barrel or cylinder 3 is an ordinary pump piston 11 carried on the upper end of a hollow piston rod 6. This cylinder has exhaust ports 12—12 and inlet ports 13—13 for passage of oil or other liquid from the well through the pump barrel 3 and into delivery pipes 8 and 10.

The portion of the tubular or hollow piston rod 6 within the air inlet chamber 4 is perforated at 14 for admission of air from the pump and on the lower end of this rod is an exhaust pipe 15 also provided with perforations 16 for exhaust of air from the air piston 2. By referring to Figure 10 it will be seen that air inlet pipe 6 extends longitudinally within the exhaust pipe 15, both pipes being connected to the center of the piston 2 as clearly shown in Figure 5.

Referring now to Figures 1 to 9 inclusive, the air piston 2 is made up of several sections, a central section 17 (see Figure 6) a plate 18, and on the opposite side of the central section are plates 19 and 20—all of the sections or plates being fastened together by bolts 21—21 and forming the piston, around which are rings 22—22 to enable the piston to tightly fit the cylinder 1.

The central section 17 of the piston is bored as shown a short way inward and screw-threaded to receive the exhaust pipe 15, the bore being reduced in diameter at 23 and extended further inward into the section to about two-thirds of the bottom and is also threaded to receive the end of the air inlet pipe 6—see Figure 5.

A vertical port 24 opens into a recess 25 in the side of the central section 17 and communicates with a slot 26, this slot being provided for the path of a valve, later referred to, and is extended upwardly into a port 26$^a$ and then downwardly, providing a port 27 for the passage of air through the piston. 28 is a divisional section in the plate 18 and forms an abutment for the valve and together with the valve obstructs the passage of air at required periods. 29 shows the valve which reciprocates within the recess 26. One end of this valve has a lug 30 receivable in the eye of a link 31, the link being in turn connected to an arm 32, centrally pivoted to the section 17 at 33. The valve is also provided with a recess 34 so that it will register with the recess 25 and ports 24, 26$^a$ and 27 for passage of air.

Referring now to the opposite side of the piston and to the right in Figure 5: In this side of the section 17 is a vertical exhaust port 35 for air exhaust into pipe 15. The inner face of plate 19 is channeled for the reception of an elongated link 36 with apertures at each end into which are inserted the lugs 37 of a pair of elongated T-shaped members 38—38. These members 38 are thus connected together by the link 36 and are positioned in a groove in the outer face of the main valves 39—39 and sustained in longitudinal alinement by a plate 40. In the plate 20 are exhaust ports 40$^a$ between which is a central divisional formation 41 which abuts the side of the plate 19. 42—42 denote port openings in the plate 19, opened and closed at proper intervals by the upper valve 39. Lower valve 39 also operates similarly in opening and closing the lower plate opening in plate 19 just below the formation 41, the lower valve 39 in Figure 5 occupying this opening in the drawing. The lower member 38 has a projection 43 and is connected to the arm 32.

This arm 32 is connected to two pairs of springs 44 and 45. Springs 44 have one end secured to a pin 46 in plate 18 and to a strap 47 fastened to one end of the arm 32, while the opposite springs 45 are fastened to plate 20 and to straps 48—the springs and straps being for the purpose of preventing the arm 32 from becoming set in a "dead center" position and also partially serving to retract the arm in its upward and downward movements. 49 and 50 are springs secured to one end of the arm 32 and upper member 38 and are for the purpose of rocking the arm 32 to slide the valves as the piston moves against the top and bottom of the cylinder 1. In Figures 9 and 10 are shown a means for preventing the valves from slipping downward under pull of gravity while in their upward position. This is accomplished by springs 51, plunger 52 secured in a tube 53 and set in the piston in the manner shown in Figure 6, the valves having a groove 54 for engagement with the plunger 52.

The operation of the device is as follows: compressed air from the air pump enters through pipe 7 (in the delivery pipe 8) thence through the perforations 14 in the hollow piston rod 6 and passes in the direction of the arrows through the port 24, through recess 34 in the intake valve 29, thence downward through port 27 into the cylinder 1. The piston 2 will now move upward under pressure of air in the space A, the free air in space B exhausting in the direction of the arrows through port 40$^a$ into exhaust port 35 and into pipe 15, passing upward through the perforations 16 thence into pipe 9.

As soon as the piston reaches the end of its up stroke the spring 50 will come in contact with the cylinder head in space B to reverse the operation.

Particular attention is called to the action of the springs 49 and 50 and members 38—38. The purpose of these members is to take up lost motion and permit a positive and quick operation of the main valves 39—39. As soon as the spring 50 comes in contact with the cylinder head the member 38 begins to move downward, the main valve 39 remaining stationary, it being held in position by the plungers 52—52. When the member has moved downward, say about one-half inch or so, it engages the valves 39—39 through the lugs 37 and link 36. During this movement of the member 38, the arm 32 is pushed downwardly, arm 32 being pivoted at its center, assisted by its springs, moves to close upper port 42, open the lower port 42 and through the opposite end of the arm and link 31 slide valve 29 to close port 27 and open the upper port 26$^a$. Compressed air will now pass into opening or port 26$^a$ thence into space B and the piston moved downward, exhaust air passing now through lower port 42. The lower spring 49 will reverse the operation on coming into contact with the bottom of the cylinder in space A.

In the meantime, the pump piston 11 on its upward movement has drawn in oil or other liquid through lower port 13 and forced it upward into the delivery pipe 8, through upper port 12. On the downward stroke of the piston the oil or liquid will be drawn into pump barrel 3 through upper port 13 and force it out through lower port 12 through pipe 10.

It should be understood that the device will also operate with gas the same as with compressed air and afford equally as good results.

What is claimed is—

1. In a compressed air motor, a cylinder, a piston therein having a central bore, an inlet pipe connected to the bore, an outlet pipe surrounding the inlet pipe, said piston having a port opening through its top and a port opening through its bottom which ports are alternately in communication with said central bore, a valve controlling the communication between said ports and bore, said piston having exhaust ports opening through its top and bottom and having an inner exhaust port communicating with said outlet pipe, main valves controlling communication between the inner exhaust port and the top and bottom exhaust ports, members slidably carried by the main valves, a link connecting the members, a centrally pivoted arm on the piston connected to the first named valve and to one of the members, a spring on an end of said arm to actuate the latter, and a spring on one of the members, said springs respectively engaging opposite end walls of the cylinder to operate the valves.

2. In a compressed air motor, a cylinder, a piston therein having an air inlet and outlet and having air inlet and exhaust ports communicating with the respective inlets and outlets, a main valve controlling the communication between the air inlet and inlet port, a pair of main valves controlling the communication between the air outlet and outlet port, an actuating member having lost-motion connection with each of said pair of main valves, means to connect the actuating members for simultaneous movement, and means connected to the said connecting means and to the first named main valve for operating said parts in opposite directions.

In testimony whereof I have signed my name to this specification.

DAVID R. TRIPPLEHORN.